United States Patent

Yamaguchi et al.

Patent Number: 5,923,914
Date of Patent: *Jul. 13, 1999

[54] METHOD FOR DETERMINING WHETHER FILM IS DEVELOPED OR UNDEVELOPED

[75] Inventors: Takuji Yamaguchi; Noboru Michiue; Shigetaka Nakamura, all of Wakayama, Japan

[73] Assignee: Noritsu Koki Co., Ltd., Wakayama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/731,981

[22] Filed: Oct. 23, 1996

[30] Foreign Application Priority Data

Oct. 25, 1995 [JP] Japan .................................. 7-277737

[51] Int. Cl.⁶ .................................................. G03B 17/26
[52] U.S. Cl. ......................... 396/515; 396/392; 396/210
[58] Field of Search ................................... 396/207, 210, 396/515, 516, 567, 392

[56] References Cited

U.S. PATENT DOCUMENTS

| | | |
|---|---|---|
| 4,214,822 | 7/1980 | Moodie . |
| 4,311,377 | 1/1982 | Matteson .................................. 354/217 |
| 4,860,037 | 8/1989 | Harvey ....................................... 354/21 |
| 5,347,334 | 9/1994 | Smart et al. . |
| 5,521,662 | 5/1996 | Suzuki ........................................ 354/76 |
| 5,539,484 | 7/1996 | Wakabayashi ............................. 354/21 |
| 5,541,681 | 7/1996 | Cocca et al. ............................... 354/21 |
| 5,561,489 | 10/1996 | Yamaguchi et al. ..................... 396/567 |
| 5,565,912 | 10/1996 | Easterly et al. ............................ 348/96 |
| 5,585,879 | 12/1996 | Tahara et al. ............................ 396/570 |
| 5,598,236 | 1/1997 | Ueda et al. .............................. 396/319 |
| 5,678,087 | 10/1997 | Carr ......................................... 396/319 |
| 5,687,414 | 11/1997 | Hariguchi et al. ....................... 396/391 |

OTHER PUBLICATIONS

Patent Abstracts Of Japan, vol. 095, No. 011, Dec. 26, 1995, & JP 07 219195A (Fuji Photo Film Co. Ltd.), Aug. 18, 1995, * abstract *.

*Primary Examiner*—Safet Metjahic
*Assistant Examiner*—John Chizmar
*Attorney, Agent, or Firm*—Wenderoth, Lind & Ponack, L.L.P.

[57] ABSTRACT

Determination is made whether a film stored in a new type of film cartridge is developed or not before the film is processed. A detection sensor detects whether or not there is a nail on an outer wall of the new type of film cartridge to judge whether the film stored in the cartridge is developed or not. Infrared sensors and visible light sensors detect whether or not the film fed from the cartridge under the instruction of a control circuit is developed or not. If both the nail detection sensor and the infrared and visible light sensors give the same result, the result is judged to be correct.

10 Claims, 16 Drawing Sheets

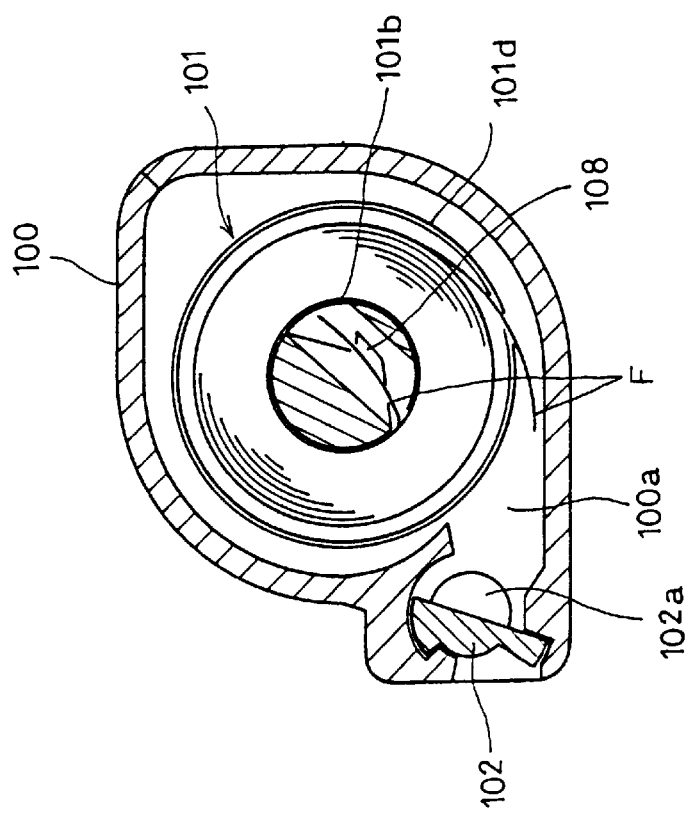
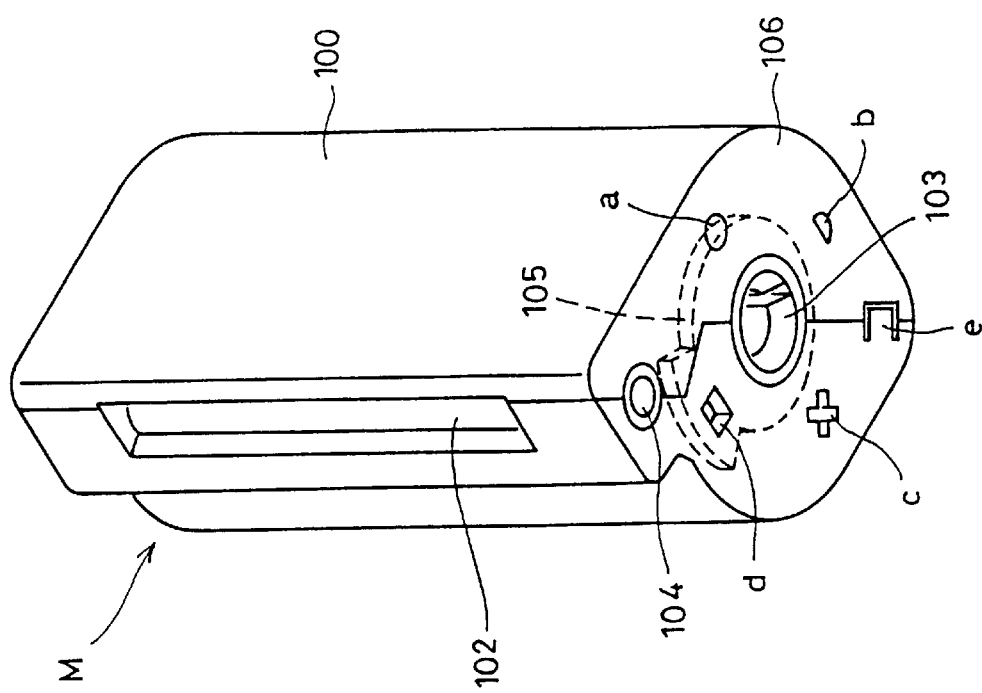
FIG. 15B
FIG. 15A

METHOD FOR DETERMINING WHETHER FILM IS DEVELOPED OR UNDEVELOPED

BACKGROUND OF THE INVENTION

This invention relates to a method for determining whether the film stored in a new type of film cartridge is a developed film or an undeveloped one.

Ordinarily, a film is stored in a snail-shaped cartridge called "patrone" with the leading end of the film slightly protruding from the cartridge. Use of such conventional patrones involves various problems. Recently, a new type of cartridge was developed that is free of such problems. Such new type of film cartridge is disclosed in U.S. Pat. Nos. 5,347,334 and 5,031,852.

This film cartridge has a snail-shaped configuration like patrones but is smaller than patrones. It comprises two splittable parts so that the film wound around its spool can be taken out if necessary. It can store not only an unexposed film but also a developed and printed negative film.

An unexposed film is stored entirely in the cartridge prior to use. The film outlet is completely closed by a lid. When the cartridge is set in a camera, the film is fed out of the cartridge through its outlet by rotating the spool with the film outlet lid open.

The film trailing end is secured to the spool by engaging ribs protruding from a slit formed into the spool in holes formed in the trailing end of the film. The spool has flanges provided with edge members as film feed guides. Disposed between one of the spool flanges and the inner surface of the case is an arcuate disk plate carrying marks that indicate that the film is unexposed, exposed or developed, or bar codes for preventing double exposure.

FIGS. 15A–16B show this new type of film cartridge M. It is disclosed in the above-mentioned U.S. Patents. The structure of this film cartridge will be fully understood by referring to these patent documents.

As shown in FIG. 5, the film cartridge M contains a film take-up spool 101 in a snail-shaped cartridge case 100. Unlike patrones, the case 100 comprises two separable halves as shown. A door 102 is provided at a film outlet defined between the two halves when they are closed. Rotary shafts are connected to the spool 101 and the door 102 at one end of the cartridge. The respective rotary shafts are rotated by drive shafts that are inserted in holes 103 and 104.

At the end of the cartridge at which are the rotary shafts, an indicator plate 105 having a sector portion is provided. Differently shaped holes a–d are formed in an end plate 106 of the case. The holes a to d indicate that the film is unexposed (not photographed), partially exposed, exposed (but not yet developed), and developed, respectively. By rotating the indicator plate 105, its sector portion, colored white, can be brought into alignment with one of the holes a–d, so that the hole brought into alignment with the sector portion turns white. Thus, one can see the state of the film by checking which hole is colored white.

As seen in FIG. 15B, the film F around a spool shaft 101b of the spool 101 is entirely wound into the cartridge case 100 and completely shielded from light by closing the film outlet with the door 102. To expose the film, i.e. to take pictures, the door 102 is opened and the spool 101 is rotated to push the film F out of the cartridge.

To wind film F on the spool 101, as shown in FIG. 16B, the trailing end of the film F is inserted in a slit 107 formed in the spool shaft 101b until a rib 108 engages in a hole h formed in the film F near its trailing end. Then, the spool 101 is rotated. When the film is entirely wound around the spool 101, a cutout 109 formed near the leading end of the film F is caught by a skirt of the flange 101c and the film stops.

In order to develop and print a film stored in this type of film cartridge, the trailing end of the film has to be separated from the spool be fore feeding it into a developing or a printing machine. However, it is impossible to automatically separate the film from the spool. Thus, in order to effectively develop a film stored in such film cartridge, the film has to be rewound onto e.g. an intermediate cartridge.

A film winding device for winding a film into such an intermediate cartridge or a similar film take-up unit is disclosed in Unexamined Japanese Patent Publication 5-232633. This winding device has a film cartridge receptacle, and a film take-up unit spaced a predetermined distance from the receptacle. Film feed rollers and a film guide are provided therebetween and separate motors are provided for the film cartridge and the feed rollers.

The film is fed by rotating the spool in the film cartridge with a film cartridge motor until the film leading end is caught by the feed rollers. Thereafter, the film is fed to the take-up unit by rotating the feed rollers with the feed roller motor. When the film trailing end gets clear of the cartridge and the feed rollers, the respective motors stop. But due to the inertia of a flywheel provided between the spool and the film cartridge motor, the spool tends to keep rotating for a short while after the motors have stopped.

Due to this extra rotation of the spool, the rib will disengage from the hole in the film near its trailing end. In this state, the feed roller motor is reactivated to feed the film until its trailing end separates from the feed rollers. The film is thus separated from the spool in the film cartridge.

A similar device is disclosed in Unexamined Japanese Patent Publication 6-130633. The separator of "an engaging device and a separator for photographic film" disclosed in this publication has a release plate adapted to be inserted into the film cartridge through a film outlet formed in the cartridge case to disengage the trailing end of the film from a rib in a slit of a spool shaft.

This new type of film cartridge is designed to automatically feed film. A film is stored entirely in the cartridge, irrespective of whether the film is an exposed one or an unexposed one, unlike a patrone in which a film is stored with its leading end slightly protruding from the case. The leading end of the film is fed by rotating the spool.

It is impossible to visually check whether the film in such a film cartridge is developed or undeveloped. Instead, this is determined by checking the indicator plate provided near one end wall of the film cartridge as described above, or by checking whether or not the cartridge has a nail (hereinafter IPI nail or simply nail). If no nail is detected, the film is developed, and if detected, the film is not developed.

If an undeveloped film is mistaken for a developed film and exposed to light for e.g. printing, its images will be lost completely. The lost images might have been an invaluable asset for a customer. In order to prevent such an accident, it is highly desirable to double-check if each film is a developed one or not before it is fed out of the film cartridge.

But such a double-check method has not yet been established for this new type of film cartridge. Thus, in order to positively prevent such accident, it is necessary to double-check again if each film is a developed one or not before it is fed into a processing machine.

An object of this invention is to provide a method of identifying the film type which can positively identify the type of film stored in a film cartridge of the abovementioned new type.

SUMMARY OF THE INVENTION

According to this invention, there is provided a method of determining the type of film. The method includes detecting whether or not a film cartridge containing a film has a nail on its case wall to determine whether the film therein is a developed film or an undeveloped film, detecting whether or not the film in the film cartridge is a developed film or an undeveloped film by sensing with a sensor the film slightly fed out of the film cartridge, and determining the type of film based on whether or not the judgment of whether or not the film cartridge has a nail and the judgment by the sensor coincide with each other.

Either a developed film or an undeveloped film is stored entirely in a new type of film cartridge. Thus, it is impossible to determine whether the film stored in the cartridge is developed or not simply by visually checking from the outside. Thus, the cartridge is provided on its end wall with an indicator which indicates that the film is unexposed, partially exposed, exposed or developed, or a nail which indicates that the film is undeveloped (if a nail is detected) or developed (if no nail is detected).

But it is dangerous to entirely trust these indicators, particularly a nail indicator because a nail is bent by human hand. It is therefore desirable to check the film type immediately before the film is developed, printed or rewound. The abovementioned method is essential for processing the film safely and reliably.

In the abovementioned method, if the results of detection of a nail on an end wall of the film cartridge and the detection by the sensor coincide, it is determined that the results of detection are correct. Film type is thus judged to be developed or undeveloped based on the results of plural detections.

In a preferred arrangement of this method, if a nail is not detected on the film cartridge and if a visible light sensor and an infrared sensor detect that the film is a developed film, judgment is made that the film is a developed film, and if a nail is detected on the film cartridge and if an infrared sensor detects that the film is an undeveloped film, judgment is made that the film is an undeveloped film. In this arrangement, the result of detection of a nail is used merely as a reference confirmation.

If a nail is not detected on the film cartridge and if a visible light sensor detects that the film is undeveloped film, judgment is made that the film is an undeveloped film based on the judgment by the sensors. This is because there is a possibility that the nail may have been erroneously bent in spite of the fact that the film is not developed.

On the other hand, if a nail is detected on the film cartridge and if an infrared sensor detects that the film is a developed film, it is preferable to judge that the film type is unidentifiable. This is because it is less likely that an operator forget to bend the nail in spite of the fact that the film is developed, compared with the possibility of erroneously bending the nail. Thus, in this case, it is highly probable that the infrared sensor is malfunctioning.

Other features and objects of the present invention will become apparent from the following description made with reference to the accompanying drawings, in which:

BRIEF DESCRIPTION OF THE DRAWINGS

FIG. 15A is a perspective view of a film cartridge;

FIG. 15B is a sectional view thereof;

DETAILED DESCRIPTION OF PREFERRED EMBODIMENTS

Figure 1:
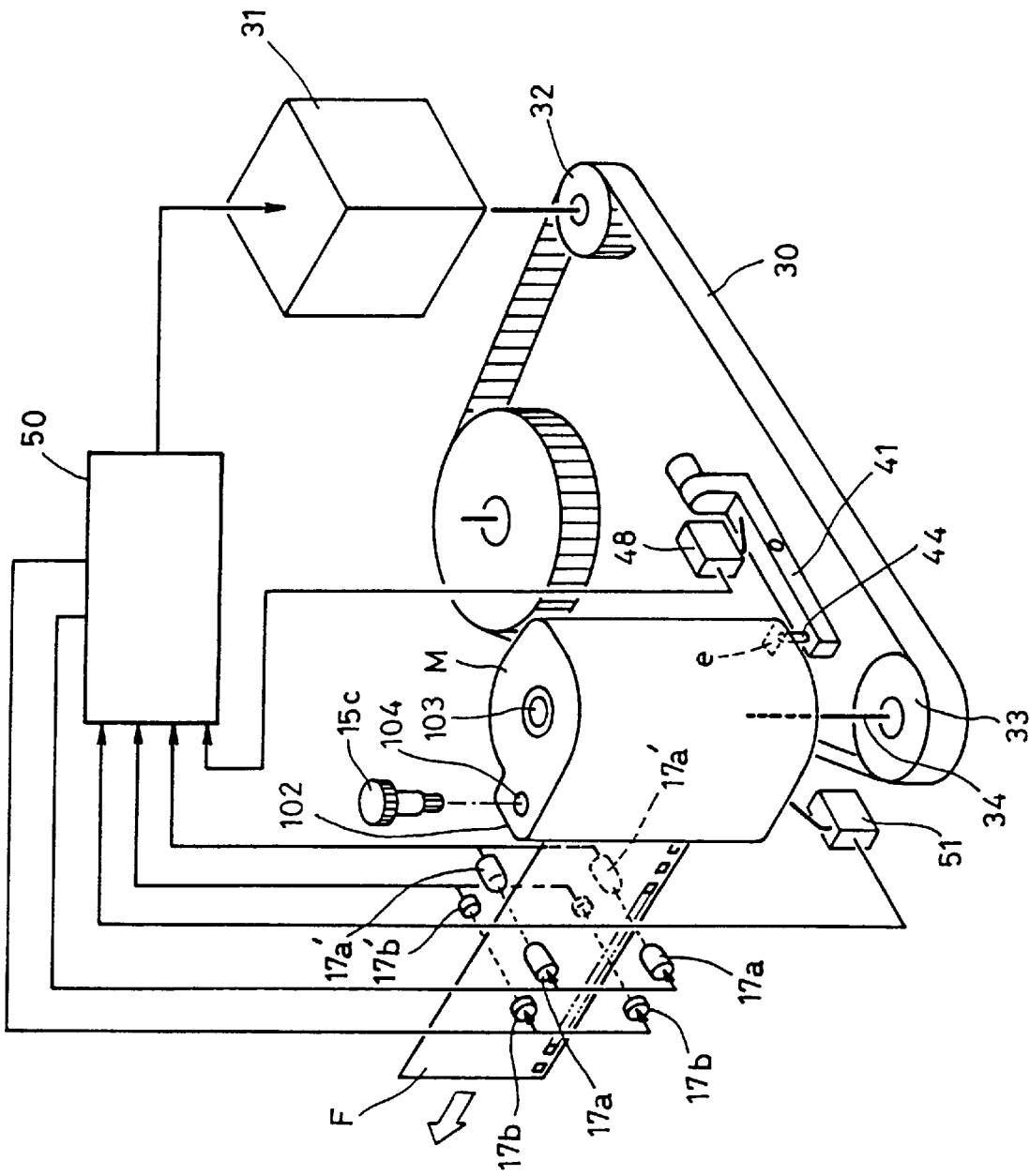
FIG. 1 is a schematic block diagram of an entire unit for carrying out a method of identifying the type of film of a preferred embodiment.

Embodiments of this invention will now be described with reference to the drawings. FIG. 1 is an entire block diagram of a control unit for identifying the kind of film in a cartridge. The same elements used in the first and second embodiments are denoted by the same numerals.

In this embodiment, a nail detector, a film sensor and a film type sensor are used to reliably determine the kind of film.

A film cartridge M houses a film, which is fed out by rotating a rotary shaft 34 with a thrust motor 31 through an endless belt 30 wound around pulleys 32 and 33. The cartridge M has a spool shaft having its top end supported by a suitable means, and a door 102 into which is inserted a manual or motor-driven, door-opening shaft. The film is fed out through the door 102 after the door has been opened by rotating the door-opening shaft.

Though not shown, the cartridge M is set in a completely light-shielded space to prevent the film in the film cartridge from being exposed to light in case the film should be an undeveloped one.

There are provided four pairs of sensors each arranged in a vertical row, and comprising a front pair of infrared LED's (light emitting diodes) 17a, a rear pair of infrared photosensors (phototransistors) 17a', a front pair of visible light LED's 17b and a rear pair of visible light photosensors 17b'.

Numeral 51 indicates a cartridge detecting sensor (switch) for detecting that the film cartridge M has been set in a predetermined position, and numeral 48 indicates a sensor for detecting a nail e. The sensor 48 is connected to one end of a lever 41 having a protrusion 44 at the other end. The signals from these sensors are all sent to a control circuit 50, which, based on these signals, controls the thrust motor 31, infrared LED's and visible light LED'S.

Figure 2:
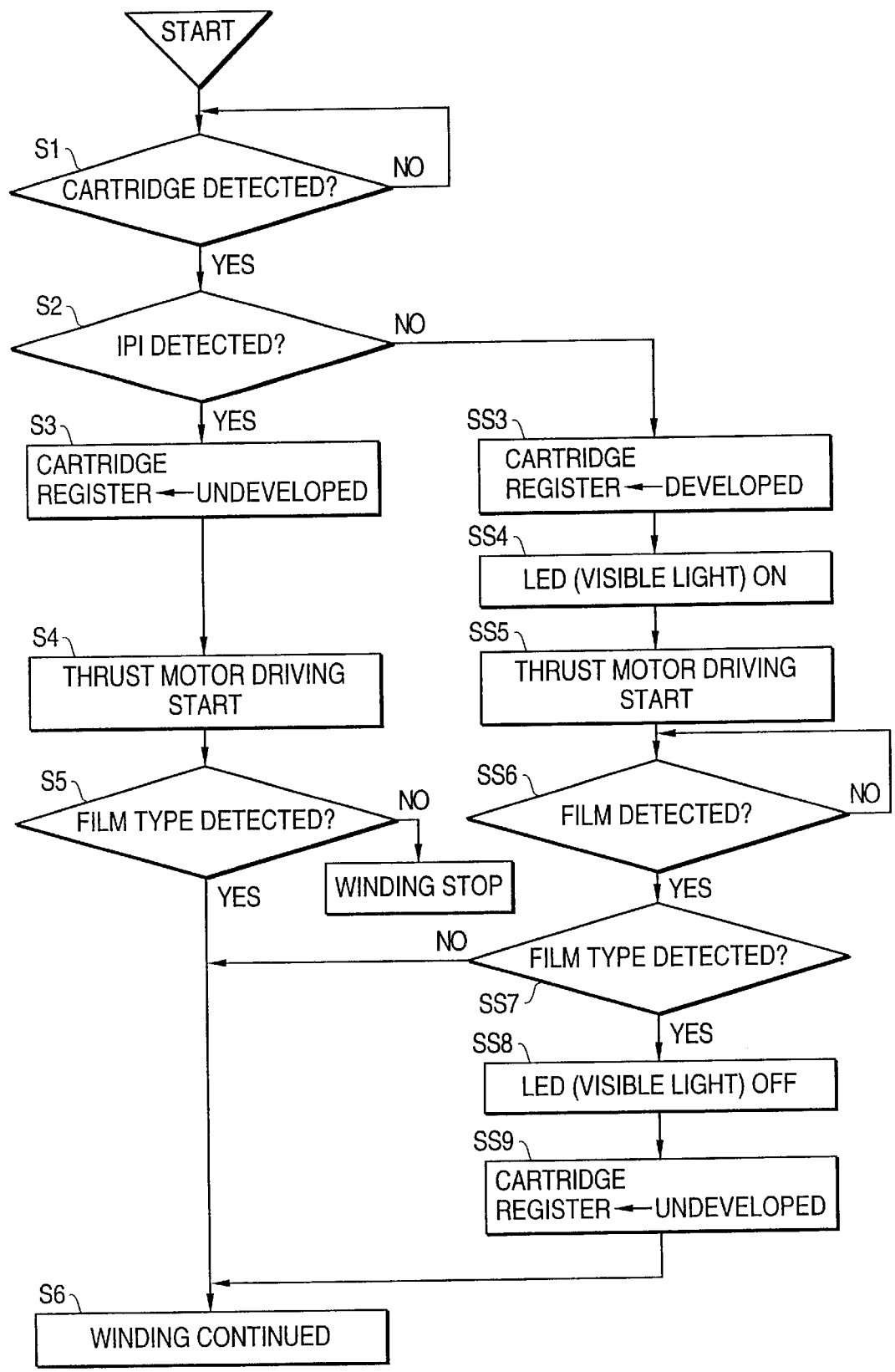
FIG. 2 is a flowchart showing the steps of the abovementioned method.

Now referring to the flowchart of FIG. 2, description is made on how the film type determining unit of this embodiment determines whether the film is a developed film or an undeveloped one.

In the initial Step S1, the control circuit 50 determines if the cartridge has been set in position based on the signal from the cartridge detecting sensor 51 so that the following operation can be carried out smoothly and reliably. In Step S2, IPI detection is made (it is determined whether the film is a developed one or an undeveloped one by detecting whether or not a nail is present) based on the signal from the nail detecting sensor 48. If a nail is present, the film is judged undeveloped and if it is not, it is judged developed.

It is possible to detect whether the film is a developed one or an undeveloped one by using only the nail detecting sensor or the infrared sensors. But by using both of them, it is possible to detect the film type with higher reliability.

If the result of IPI detection is affirmative (a nail has been detected), information on undeveloped film is written in a cartridge judgment register in Step S3, based on judgment that the film is an undeveloped film. Then in Step S4, the thrust motor 31 is activated to feed film.

When the film is fed out slightly, the infrared sensors 17a' scan the film to determine the type of film again (Step S5) based on the amount of light detected passing through the film. If the sensors 17a' give the same judgment as the nail detecting sensor, i.e. judgment that the film is undeveloped, it is doubtless that the film is an undeveloped film. The film is thus fed on (Step S6). Though not shown, a display means may be provided to display the fact that the film is an undeveloped one.

If the judgment in Step S5 is negative, i.e. the film is judged to be a developed one, the control circuit stops the feed of film because the judgment by the IPI detection conflicts with the judgment by the infrared sensors 17a'. Generally speaking, judgment by the infrared sensors is more reliable than the judgment based on the IPI detection. Thus, it is one way to select and adopt the judgment by the infrared sensors if the IPI detection and the infrared sensors deliver conflicting judgments.

But for safety's sake, the feed of film should be stopped in such a case on the assumption that the IPI detection is correct and the infrared sensors are malfunctioning.

If the judgment by the IPI detection is negative (no nail has been detected) in Step S2, this fact is recorded in the cartridge judging register in Step SS3. Then, the visible light LED's 17b are turned on in Step SS4, and the film is fed by activating the thrust motor in Step SS5.

The infrared LED's are kept turned on all the time.

When the film is fed out slightly, the presence of film is detected by the visible light sensors 17b' (Step SS6) and then by the infrared sensors 17a' (Step SS7). Then in Step SS7, the type of film is determined. If the judgment in Step SS7 is negative, i.e. the film is judged to be a developed one as in the IPI detection, there is no doubt that the film is a developed one. Thus, the film is fed on (Step S6).

If, contrary to the negative judgment in the IPI detection, the judgment in Step SS7 is affirmative, i.e. the film is judged to be an undeveloped one, the control circuit judges that the film is undeveloped, respecting the judgment by the infrared sensors 17a'. In this case, the visible LED's 17b are turned off in Step SS8, the data in the cartridge judging register is rewritten to the effect that the film is an undeveloped one in Step SS9, and the film is fed on (S6).

The reason why the control means gives priority to the judgment by the infrared sensors 17a' over the judgment by the IPI detection is because the former is more reliable than the latter.

Figure 3:
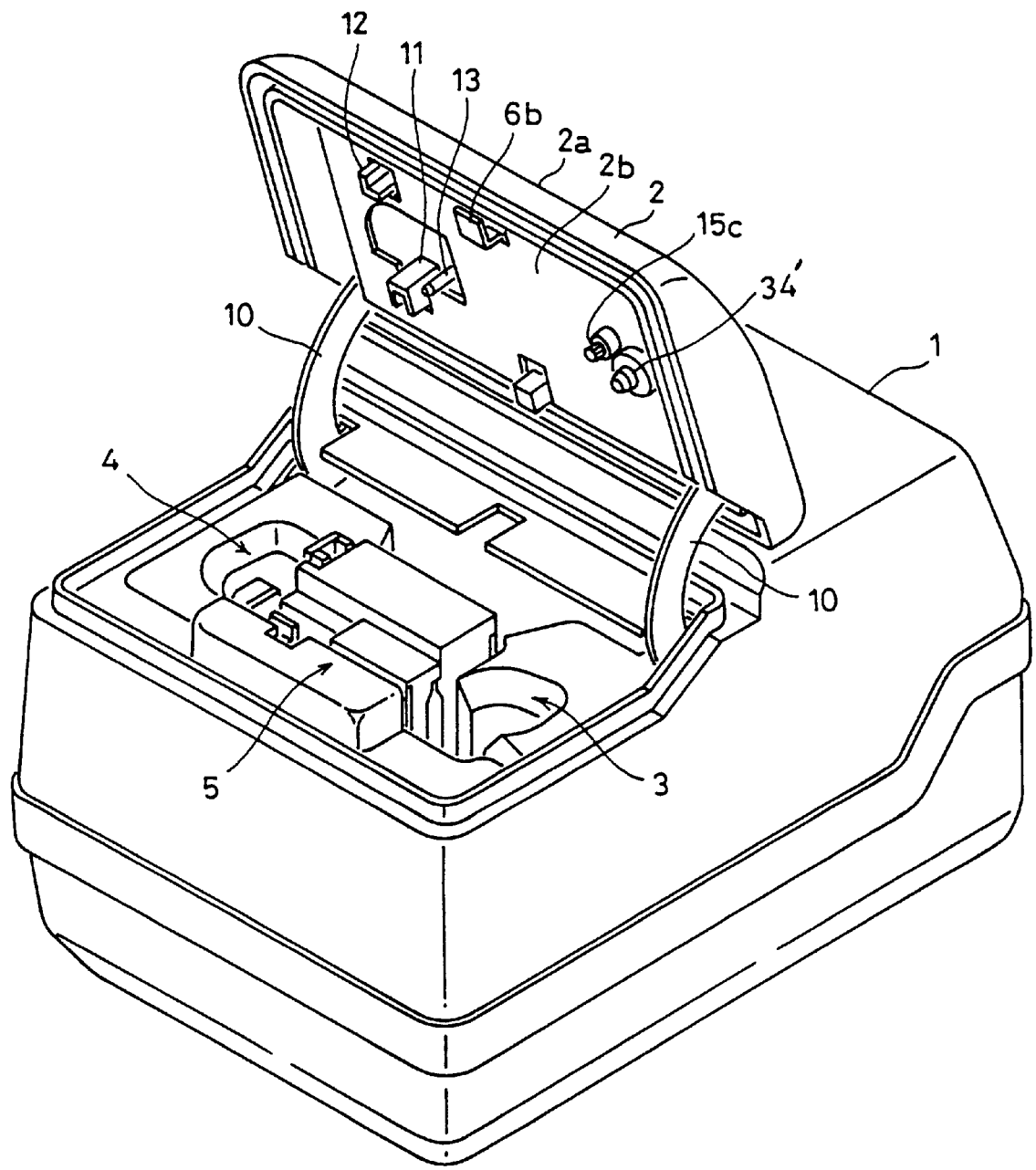
FIG. 3 is a perspective view of a film rewinder for carrying out a method of identifying the film type of the embodiment.

The above-described method of determining the type of film is carried out in the film rewinder shown in FIG. 3 and the following figures, which is an example of film processing device for rewinding a film from a film cartridge to an intermediate cartridge.

Since a film is wound with its trailing end in engagement with a hook of the cartridge spool, the film has to be manually disengaged from the hook when the film has been fed completely out of the cartridge. It is thus impossible to automatically feed a plurality of undeveloped or developed films for development or printing. To automate the developing and printing process, films in cartridges have to be cut off at their trailing ends from the spools and rewound on intermediate cartridges. The film rewinder is used for this purpose.

Figure 4:
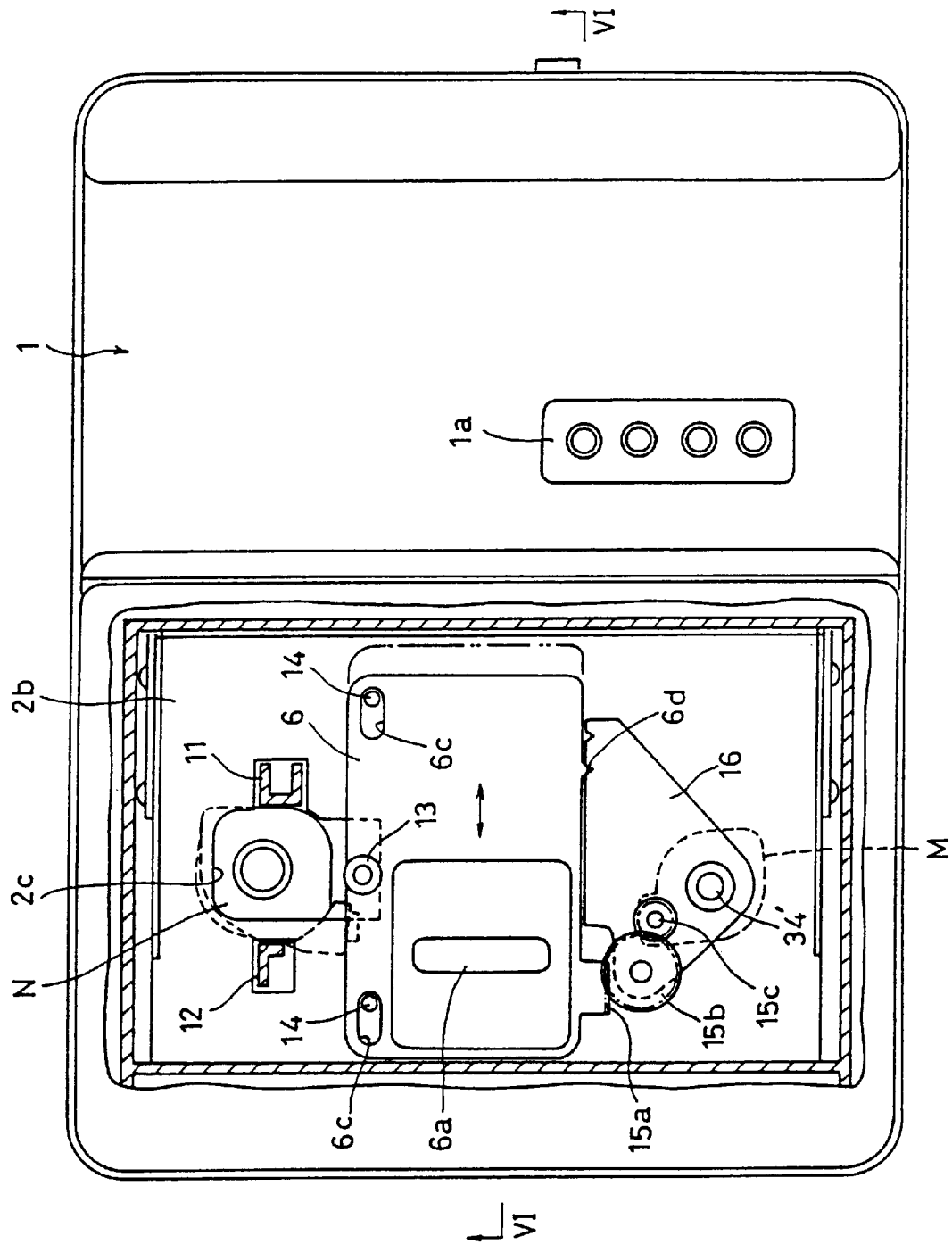
FIG. 4 is a plan view of the same with a cover plate thereof open.
Figure 5:
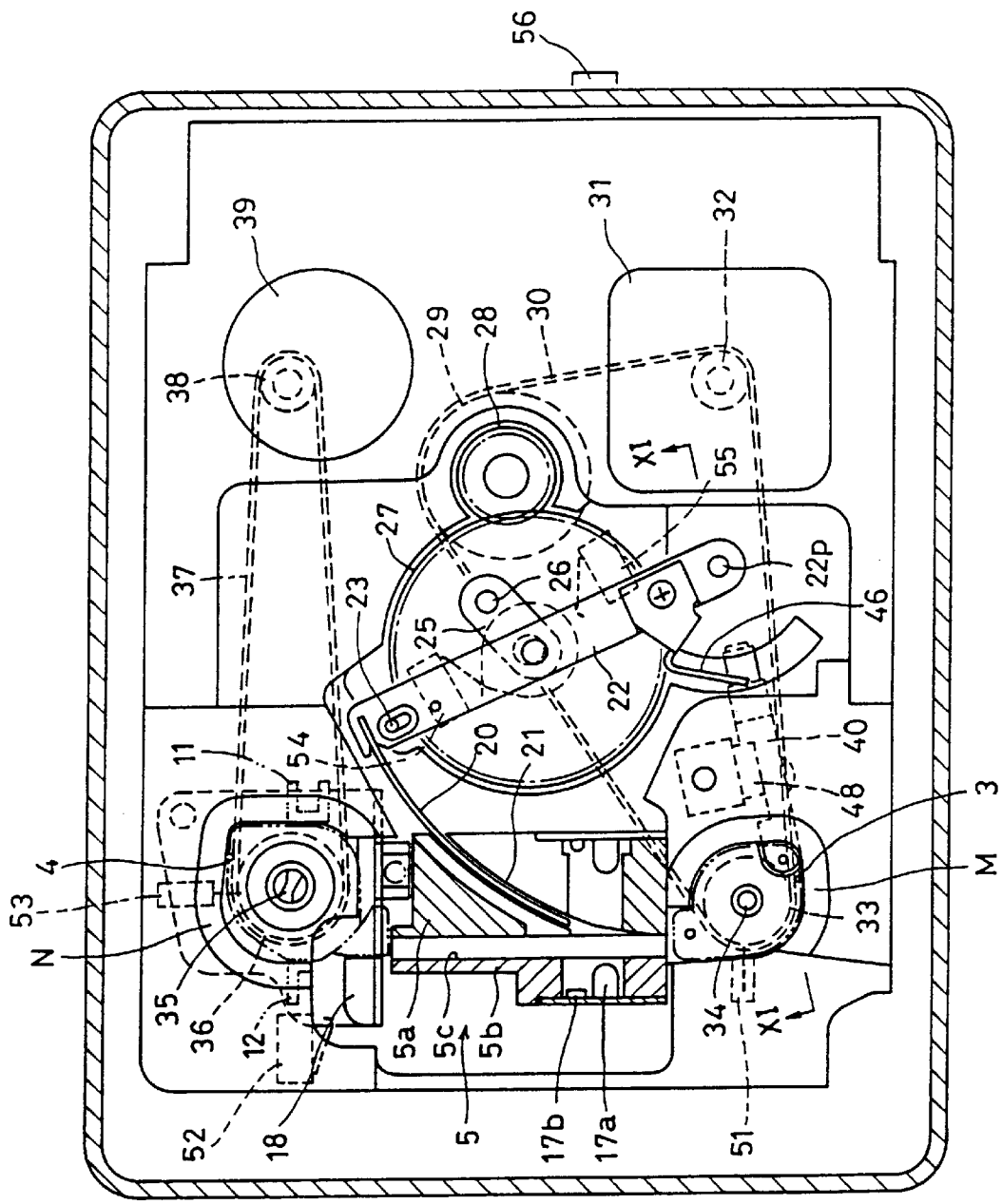
FIG. 5 is a plan view of the film rewinder showing its inner structure.

FIG. 3 is a perspective view of the film rewinder, FIG. 4 is a plan view partially sectioned by removing the cover plate, and FIG. 5 is a sectional plan view showing mechanical parts on an intermediate bottom plate. As shown in FIG. 3, a cover plate 2 is provided to cover the front top of a case 1. By opening the cover plate 2, one can see a film cartridge receptacle 3 and a winding unit 4 spaced a predetermined distance from the receptacle 3 for rewinding film to the intermediate cartridge. A film guide 5 is provided therebetween.

Figure 6:
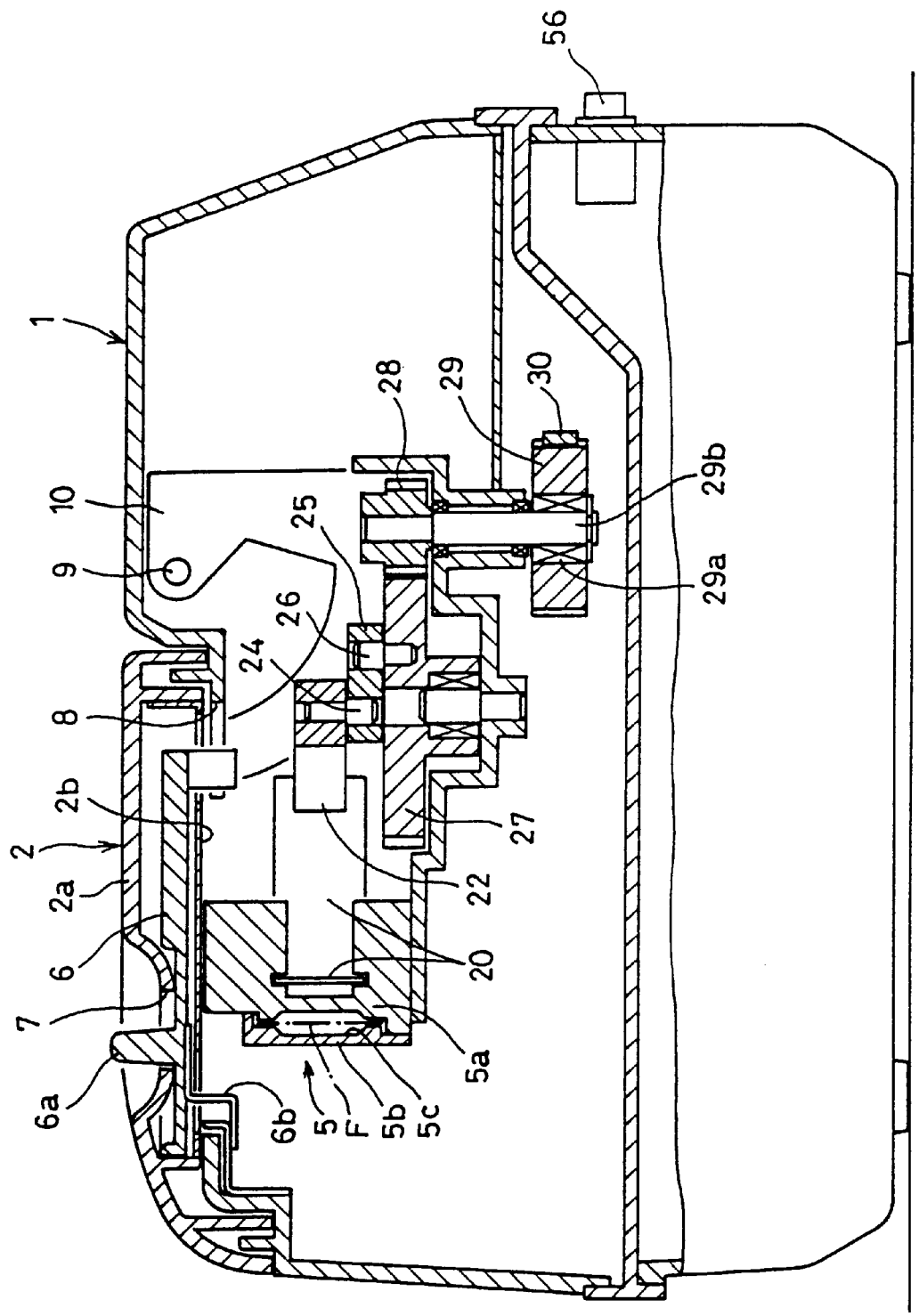
FIG. 6 is a sectional view taken along line VI—VI of FIG. 4.

As shown in FIG. 6, the cover plate 2 has a double-wall structure, comprising outer or front wall 2a and inner or back wall 2b. A knob plate 6 having a knob 6a is provided between the walls 2a and 2b. It is movable by a distance equal to the width of an opening 7 in wall 2a. The knob plate 6 has on the back thereof an engaging piece 6b. By pulling the knob 6a to the position shown in FIG. 4, the engaging piece 6b engages the case 1, thus locking the cover plate 2 in the closed position in which it closes an opening 8 of the case 1. The cover plate 2 is pivoted about a pin 9 (FIG. 6) by arms 10 (FIG. 3).

Engaging pieces 11 and 12 are provided on the back of the cover plate 2 (FIG. 3). They extend through an opening 2c formed in the back wall 2b of the cover plate 2 to support a shoulder of an intermediate cartridge N in the manner to be described below. A pin 13 provided on the back of the knob plate 6 also extends through the back wall 2b. The pin 13 is used to open and close a film inlet door of the intermediate cartridge N.

Figure 7:
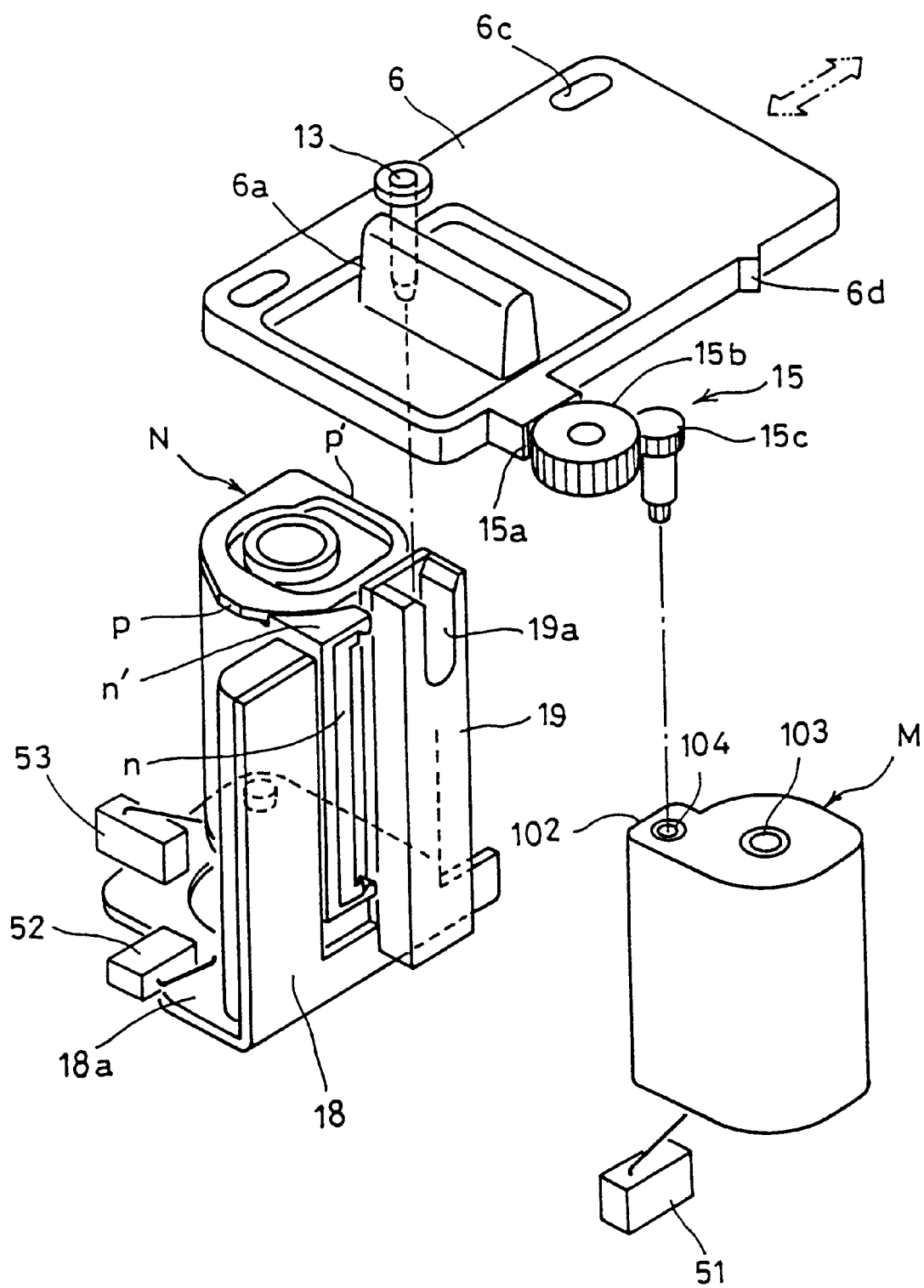
FIG. 7 is a perspective view of a mechanism for opening and closing a cartridge door by moving a knob.

The knob plate 6 is formed with two elongated holes 6c in which are received pins 14 (FIG. 4) so that the knob plate 6 is slidable back and forth between the positions shown by solid lines and two-dot chain lines. On the righthand side of the knob plate 6 as viewed from the left in FIG. 4 is a gear train for opening and closing the film feed door of the film cartridge M (FIG. 7). It comprises a rack 15a, a pinion 15b and a small gear 15c.

The cover plate 2 carries on its back wall 2b a substantially triangular fixing plate 16 having a plurality of triangular grooves (FIG. 4). The knob plate 6 has a protrusion 6d on its right side. By engaging the protrusion in one of the triangular grooves of the fixing plate 16, the knob plate 6 can be fixed in one of a plurality of positions. In FIG. 4, numeral 1a designates indicator lamps.

As shown in FIG. 3, the distance between the axes of the film cartridge M and the intermediate cartridge N should be as short as possible, i.e. the film guide 5 provided therebetween should be as short as possible for the reasons to be described below. As shown, the film guide 5 carries no feed rollers.

The film guide 5 comprises a stationary guide member 5a and a rotary guide member 5b (FIG. 5). The pressure from the cover plate 2 when it is closed is transmitted to the rotary guide member 5b by an unillustrated mechanism. With the cover plate closed, the film is fed into the space 5c between the two members 5a, 5b. While being fed through the space 5c, the film is guided by the two guide members. Numeral 17a designates an infrared sensor and 17b an LED type film sensor.

The cover plate of the intermediate cartridge N is opened and closed by a pillar 18 shown in FIG. 7. The pillar 18 is formed by bending a plate member having two forks into the shape of the letter L. The above-mentioned pin 13 is received in a deep groove 19a formed in the top end of one upright forks 19.

The intermediate cartridge N has its bottom supported not on the bent bottom 18a of the pillar 18 but on an unillustrated support member provided on the bottom of the cartridge receptacle. The cover plates n and n' provided at the film inlet of the intermediate cartridge N are sandwiched between the pillar 18 and another pillar member 19. As the pin 13 is pushed down by pressing the knob 6a, the cover n' is pushed open, so that the film F can be inserted into the cartridge N. The case of the cartridge N is supported at points p and p'.

As shown, the small gear 15C of the gear train 15 has its output shaft in engagement with a rotary shaft for opening the cover plate of the film cartridge M. By moving the knob 6a, the rotary shaft is rotated, so the cover plate is opened and closed.

As shown in FIG. 5, the film guide 5 is provided with a release guide 21 into which a tool 20 is inserted to cut off the trailing end of the film from the spool in the film cartridge M. The release guide 21 is arcuately shaped and extends from the point near the end of the film guide 5 remote from the film cartridge M to the film cartridge M. The tip of the tool 20 is moved through the release guide 21 and inserted, substantially tangential to the film inlet end of the film guide 5, into the film cartridge M to separate the film trailing end from the spool.

The radius of a release arm 22 is determined so that the tip of the tool 20 comes into contact with the back of the film when it is inserted into the film cartridge M, that it is inserted into the film cartridge M in the direction tangential to the direction in which the film extends from the film outlet of the film cartridge M to the point from which the film is unrolled from the film roll wound around the spool, and that the radius of the arc of the release guide 21 is minimum. The release arm 22 pivots about point 22p.

The tool 20 is coupled to the release arm 22 by means of a pin 23 and an unillustrated spring mechanism so as to be easily detachable for repair or replacement.

The release arm 22 is pivotable about the point 22p within a predetermined angular range. The release arm 22 is in engagement near a center pin 24 thereof (FIG. 6) with an eccentric arm 25 pivotally coupled to a gear 27 by means of a pin 26.

The gear 27 is in mesh with another gear 28, which has a coaxial pulley 29 around which is wound a belt 30 driven by motor 31 through an output pulley 32. The belt 30 also extends around a pulley 33 coaxially coupled to a rotary shaft 34 for rotating the spool of the film cartridge M. By rotating the spool, the film F in the film cartridge M is fed.

The winding unit 4 for the intermediate cartridge N for rewinding the film fed from the film cartridge M to the intermediate cartridge N has a rotary shaft 35 for rotating the spool of the intermediate cartridge N. A belt 37 is wound around a pulley 36 coaxially coupled to the rotary shaft 35. The belt 37 is driven by a motor 39 through an output pulley 38.

Figure 8:
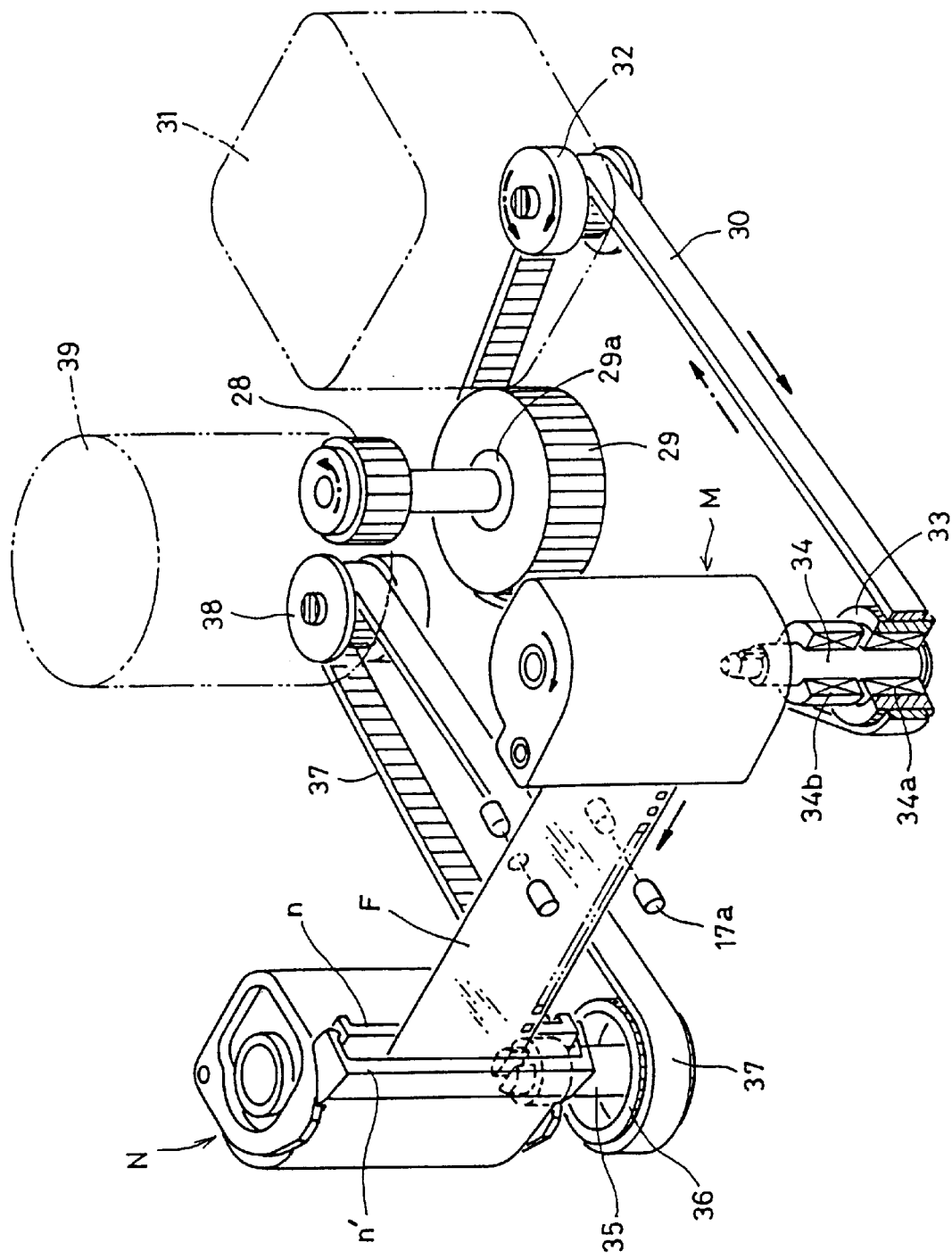
FIG. 8 is a schematic perspective view of the entire driving unit.

FIG. 8 is a perspective view showing the above-described driving mechanism in detail. This figure will enhance understanding of the driving mechanism of the film rewinder.

Description is now made of the operation of the film rewinder according to the present invention.

The film cartridge M and the intermediate cartridge N are set in the receptacle 3 and the winding unit 4, respectively, with the cover plate 2 open. Then, the cover plate 2 is closed and the knob 6a is pulled until the engaging piece 6b engages the case to lock the cover plate 2.

By closing the cover plate 2, the guide member 5b of the film guide 5 is closed as shown in FIG. 6 (normal position). Also, by closing the cover plate 2, the intermediate cartridge N is stably held by the engaging pieces 11 and 12 on the back of the cover plate. Further, by moving the knob plate 6, the doors 102 and n of the film cartridge M and the intermediate cartridge N are opened by means of the transmission shown in FIG. 7.

Preparation for rewinding film is now complete. In this state, the film in the film cartridge M is slightly fed. The infrared LED sensors 17a check whether the film fed from the cartridge M is an undeveloped or developed one.

The film rewinder of this embodiment is used mainly to rewind developed film but can be used to rewind undeveloped film. If the film being rewound is an undeveloped one, its exposed images will be marred if subjected to visible light. Thus, infrared light is used first to check whether the film is developed or not.

If the film turns out to be a developed one, the motor 31 is reactivated to feed the film again. The film is thus guided through the film guide 5. When its tip is inserted into the intermediate cartridge N and is caught by its spool by a certain length, the spool is turned by the motor 39. The film is thus rewound around the spool of the intermediate cartridge N.

While the film is being wound around the spool of the intermediate cartridge N by the motor 39, the motor 31 for the film cartridge M is rotating in the same direction as the motor 39 to feed the film. But its revolving speed is slightly lower than that of the motor 39. The rotary shaft 34 of the film cartridge M carries a one-way clutch that allows freewheeling of the rotary shaft 34 while it is being driven by the motor 39 through the film due to the speed difference between the motors 39 and 31.

When the film is nearly completely fed out of the film cartridge M, an end mark or a small hole provided near the trailing end of the film is detected by the infrared sensors 17a and the film sensors 17b. Upon detection of the end mark, the sensors 17a, 17b produce detection signals to reverse the motor 31 for the film cartridge M.

Figure 9A:
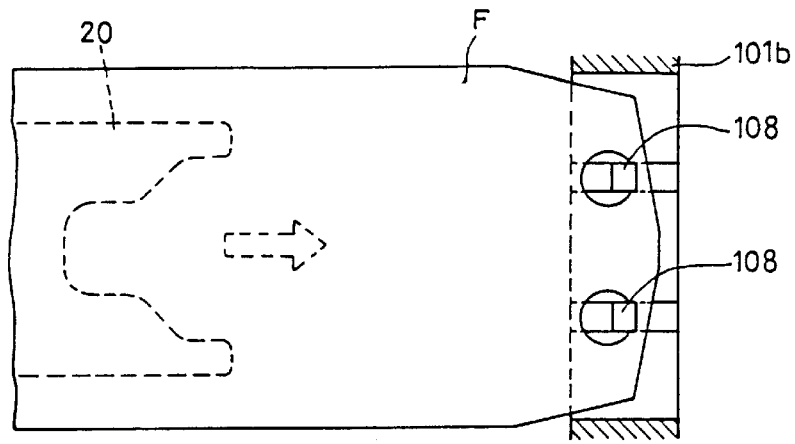
FIGS. 9A–9C are views showing how the trailing end of a film is separated from a spool by a tool.
Figure 9B:
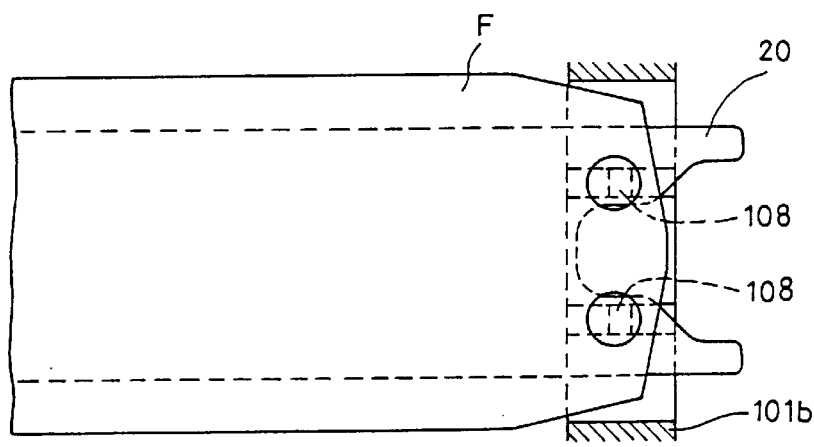
Figure 9C:
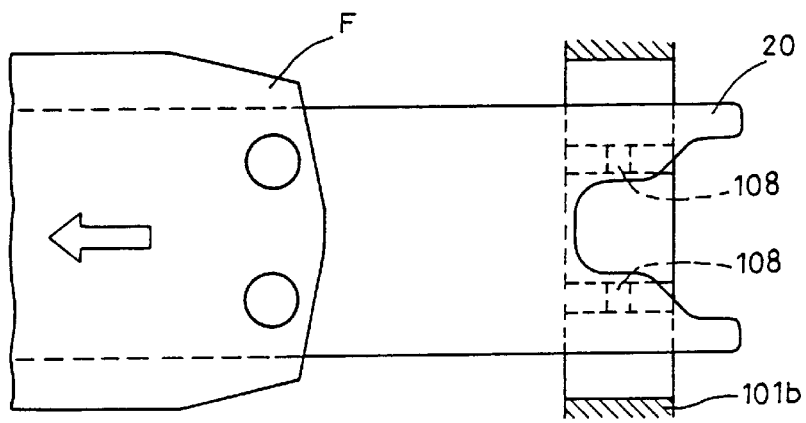

As the motor 31 is reversed, the tool 20 is moved through the arcuate release guide 21 and the film guide 5. The position of the end mark, the film feed speed and the tool moving speed are preset so that the film trailing end will come to the spool end when the tip of the tool is inserted into the film cartridge M through its door and reaches the spool. The film trailing end is thus separated from the spool by the tool 20 in the manner illustrated in FIGS. 9A–9C.

After the film trailing end has been separated from the spool of the film cartridge M, the film is wound still further and stopped with its trailing end in the film guide 5.

More detailed structure and operation of the film rewinder of this embodiment will be described with reference to FIGS. 8–14.

First, referring to FIGS. 5 and 10–12B, description is made of the mechanism for transmitting the driving force of the motor 31, which is mainly used to rotate the spool of the film cartridge M, to the tool 20.

Figure 10:
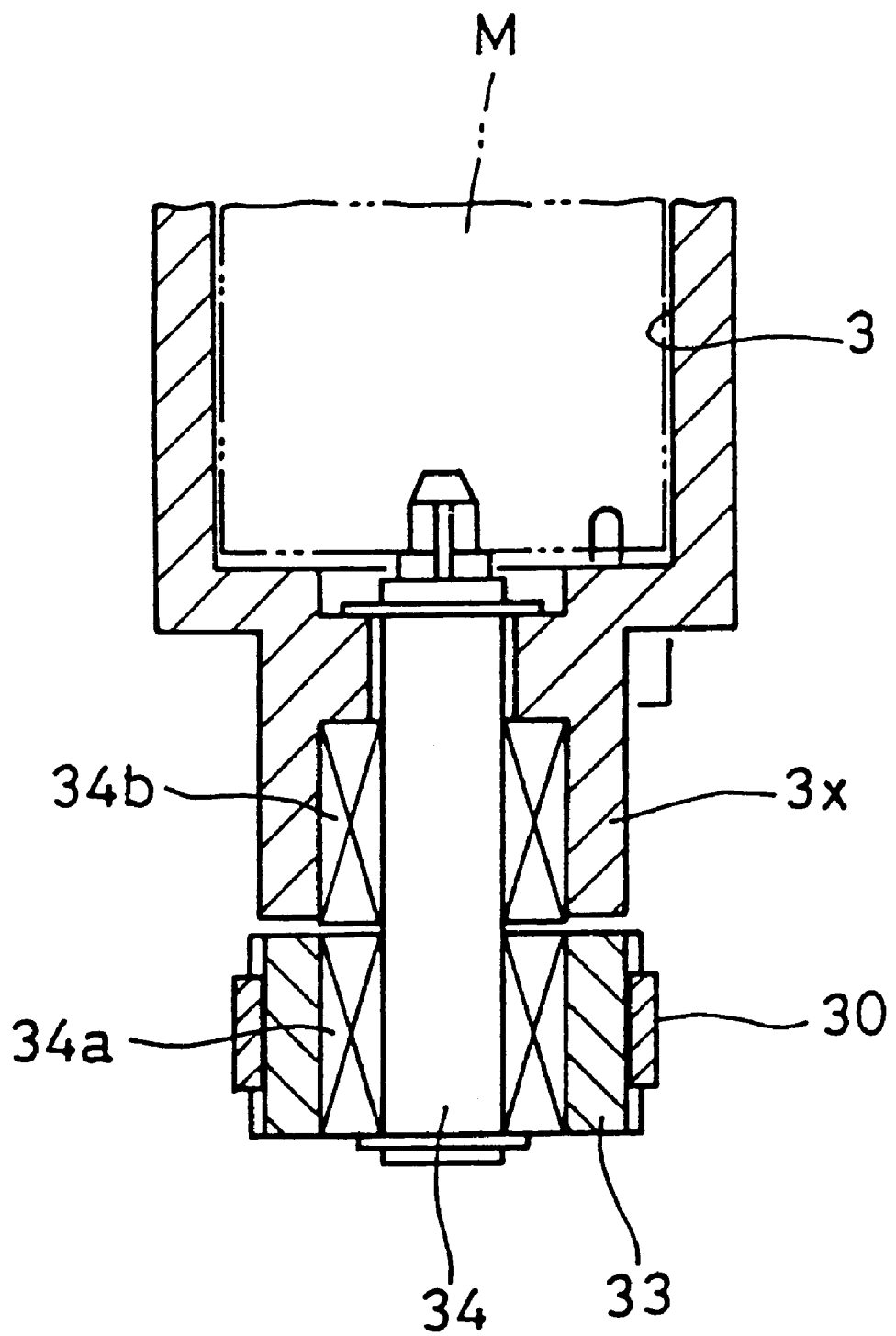
FIG. 10 is a sectional view of a rotation transmission mechanism provided under the film cartridge.

As mentioned earlier, film F is fed from the film cartridge M by rotating its spool (in the direction of the solid arrow in FIG. 8) with the motor 31. As shown in FIG. 10, a one-way clutch 34a is mounted between the pulley 33 engaging the belt 30 and the rotary shaft 34.

Another one-way clutch 34b is mounted around the rotary shaft 34 over the one-way clutch 34a. The one-way clutch 34b has its outer ring fixed to a bottom portion 3x of the receptacle 3 to allow freewheeling of the rotary shaft 34 in the normal direction and check its rotation in the reverse direction. On the other hand, the one-way clutch 34a transmits only the rotation of the belt 30 in the normal direction to the rotary shaft 34 and disconnects the rotary shaft 34 from the belt while the latter is rotating in the reverse direction.

To feed film from the film cartridge M, the spool 101 is rotated in the normal direction by the motor 31 through the one-way clutches 34a and 34b. When the film is fed nearly completely out of the cartridge and the end mark is detected, the motor 31 is reversed.

The reverse rotation of the motor is transmitted through the belt 30 to the coaxial pulley 29 and then through one-way clutch 29a to rotary shaft 29b, rotating the rotary shaft 29b and thus the pinion gear 28 and the gear 27. The rotation of the gear 27 causes rotation of the eccentric pin 26. The arm 25 thus pushes the release arm 22, pivoting the release arm 22 counterclockwise about the pin 22p.

As the release arm 22 is pivoted counterclockwise as viewed in FIG. 5, the arcuate tool 20 connected to the free end of the release arm 22 is moved along an arcuate path through the release guide 21 and the film guide 5 until its tip is inserted into the film cartridge M through its opening (not shown).

The film is thus separated from the spool of the film cartridge M by the tool 20 in the manner that has already been described above.

As the coaxial pulley 29 keeps rotating in the same direction after the film F has been separated from the spool by the tip of the tool 20, the arm 25 will now pull the release arm 22 in the direction of rotation of the coaxial pulley 29, so that the tool 20 is pulled back to its original position shown in FIG. 5. In short, the rotation of the gear 27 is converted to the pivoting motion of the tool 20 and the release arm 22 by the arm 25.

The one-way clutch 34b is provided to prevent damage to the film being fed out of the film cartridge M by positively preventing the rotary shaft 34 from rotating in the reverse direction even if the one-way clutch 34a fails to disengage soon enough when the rotating direction of the motor 31 is reversed and as a result the reverse rotation of the motor 31 is transmitted momentarily to the rotary shaft 34.

Next, description is made of a nail bending mechanism 40 for bending a nail e (FIG. 12A) of the film cartridge M if it is not bent in spite of the fact that the film in the cartridge is a developed one. (Bent nail indicates that the film in the cartridge is a developed film.) This mechanism is driven by the motor 31 through the driving force transmission mechanism for the film separating tool 20.

As mentioned above, a film cartridge M that contains a developed film is formed with a hole d in its end plate 106 (FIG. 15A). Thus, by visually checking the hole d, one can see that the cartridge contains a developed film. But in this embodiment, the infrared sensors 17a are used to check if the film is a developed one instead of visually checking the hole d.

In the arrangement of this embodiment, if the nail e is not bent in spite of the fact that the film to be rewound from the film cartridge M to the intermediate cartridge N is a developed film, the nail bending mechanism shown in FIGS. 11–12B bends the nail mechanically, thus eliminating the possibility of malfunction in various later operation steps.

Figure 11:
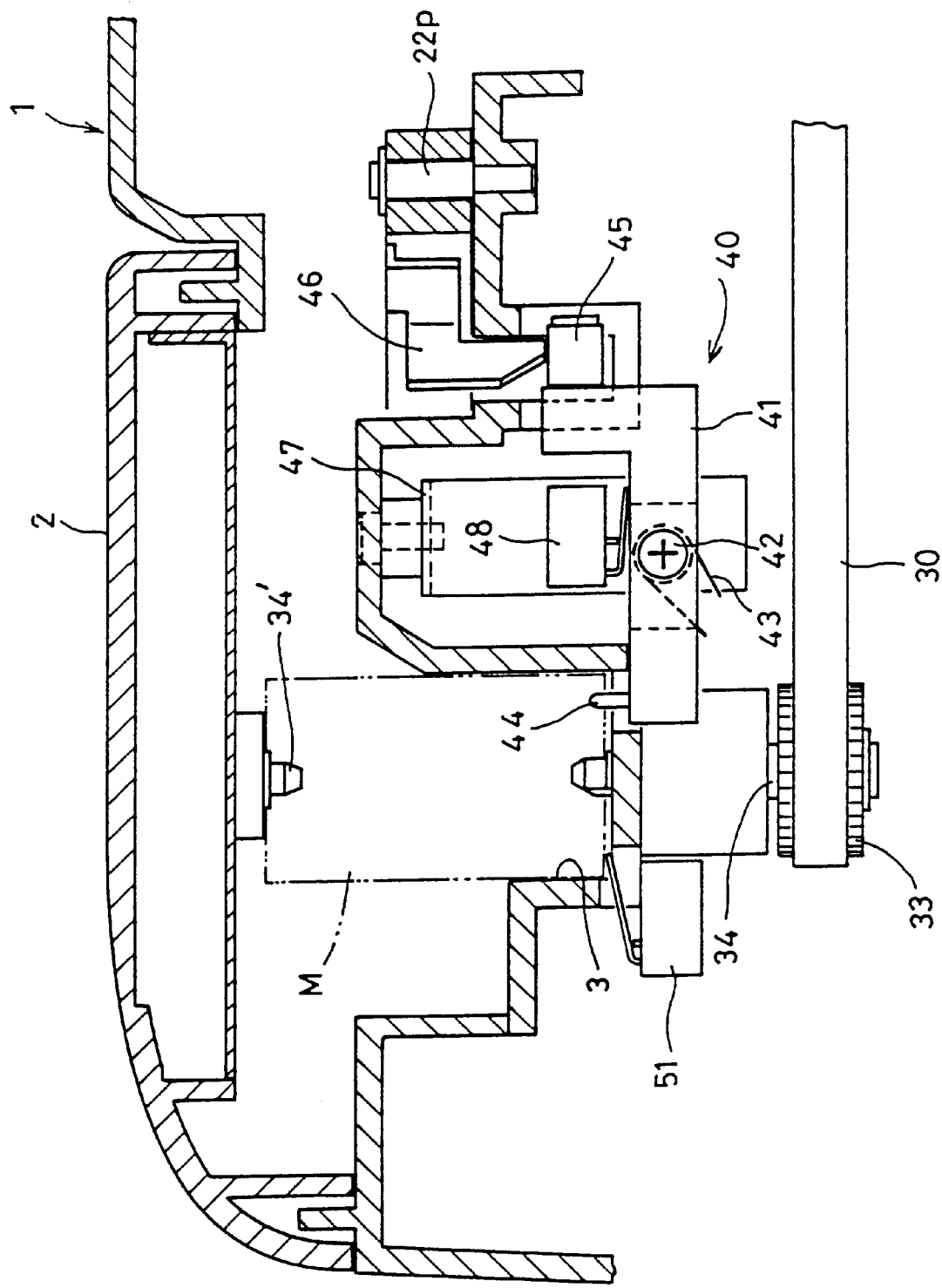
FIG. 11 is a partial sectional view taken along line XI—XI of FIG. 5.
Figure 12A:
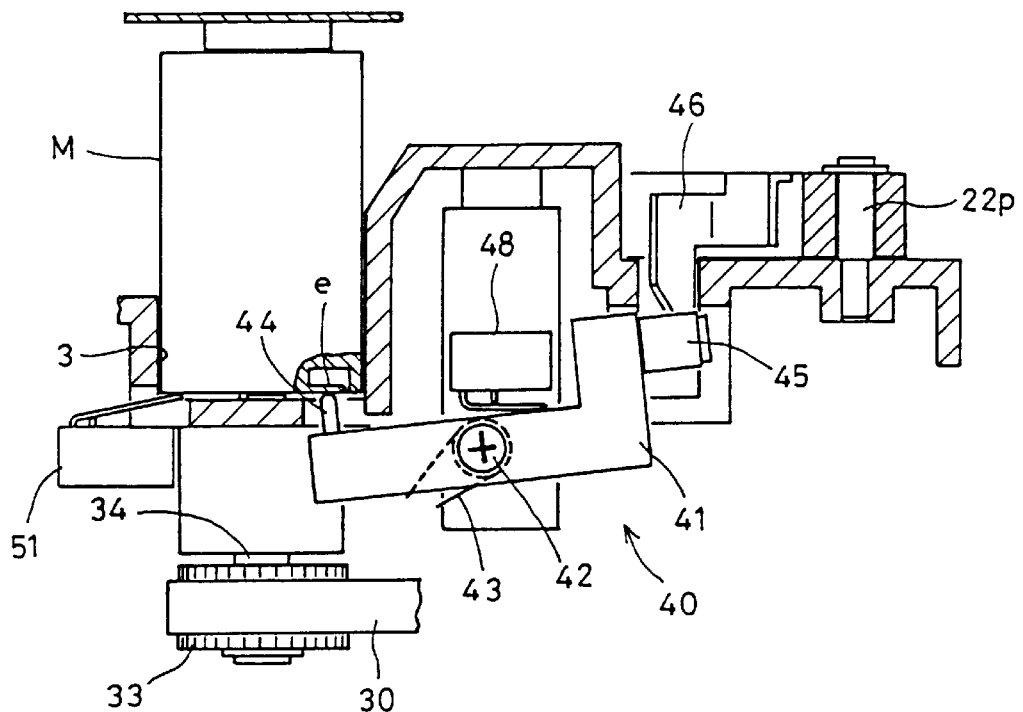
FIGS. 12A and 12B are sectional views showing the operation of the same.
Figure 12B:
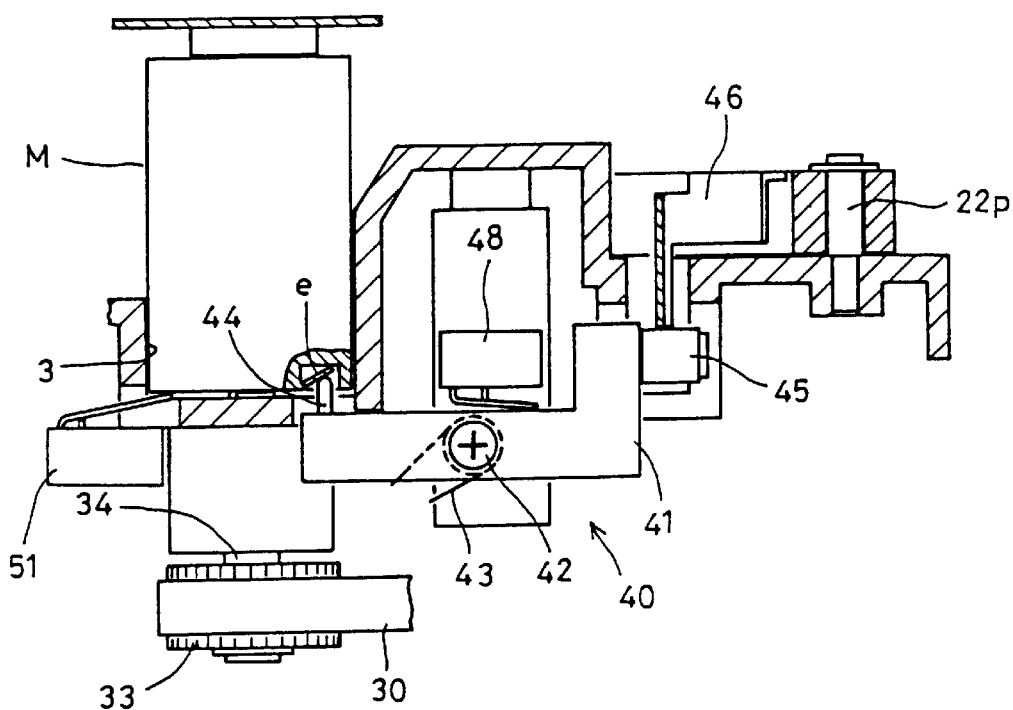

The nail bending mechanism is shown schematically in FIG. 5 by chain lines, and in detail in FIGS. 11–12B.

As shown, the nail bending mechanism 40 comprises a nail bending lever 41, a nail bending protrusion 44 provided at one end of the lever 41, a roller 45 provided at the other end of the lever 41, and a leaf spring 46 biasing the roller 45. The nail e of the film cartridge M is bent by leverage applied by pivoting the nail bending lever 41 about a hinge or pivot 42 with the nail bending protrusion 44 abutting the nail e. Numeral 47 indicates a support member.

The nail bending lever 41 is always biased by a spring 43 to a horizontal state. When a film cartridge M having an unbent nail e is set in the receptacle 3, the nail bending lever 41 is pushed by the nail e into an inclined state as shown in FIG. 12A. In this state, the roller 45 at the other end of the nail bending lever 41 abuts the inclined end of the leaf spring 46, with the release arm 22 at the rest position shown in FIG. 5.

When the release arm 22 begins pivoting in this state, the roller 45 is pushed down by the inclined end of the leaf spring 46, and the nail bending lever 41 is pivoted to the horizontal state, so that the nail e of the film cartridge M is pushed and bent as shown in FIG. 12B.

If the nail e has already been bent when the film cartridge M is set in the film rewinder, the protrusion 44 will be inserted in a recess formed in the cartridge by bending the nail, so that the nail bending lever 41 will not incline, i.e. be kept horizontal by the spring 43.

When the nail bending lever 41 is moved together with the release arm 22 to bend the nail, its movement is detected by a sensor 48.

Before feeding the film, the type of film is determined in the above-described manner by the control unit, which is actually a microcomputer.

Figure 13:
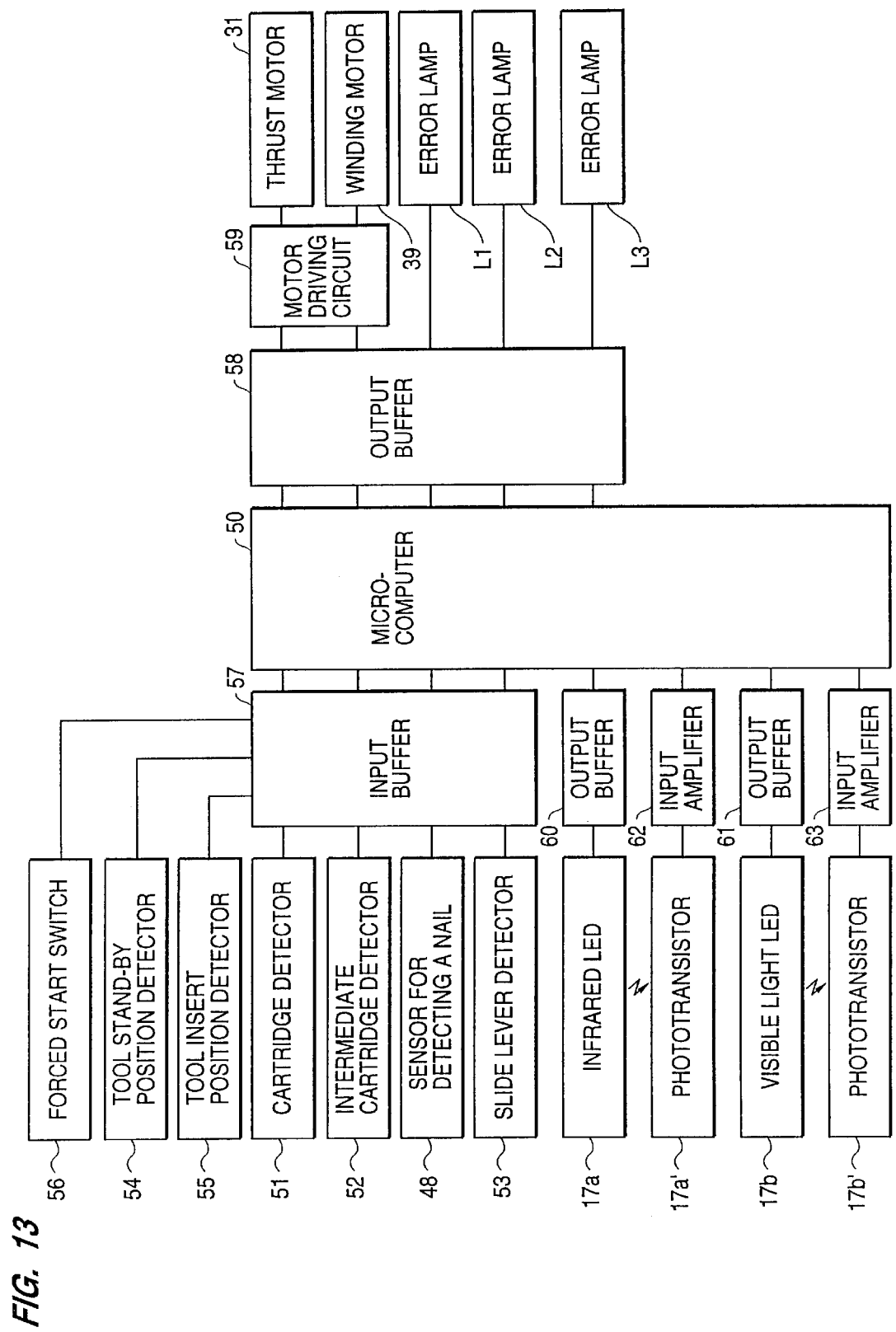
FIG. 13 is a block diagram showing the relationship between the sensor input, the control circuit and the driving unit.
Figure 14:
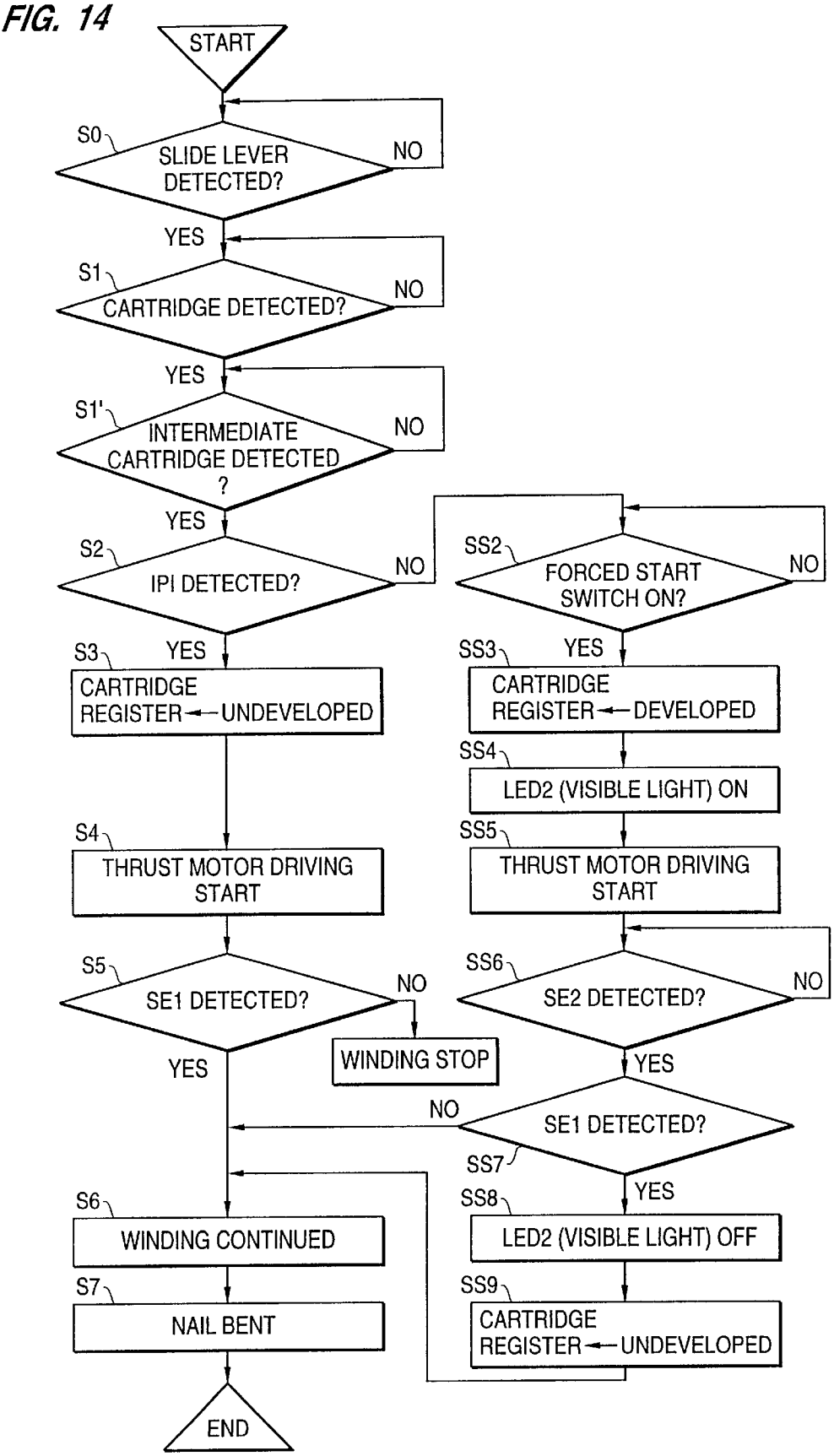
FIG. 14 is a flowchart showing the steps of the method for identifying the film type.
Figure 16B:
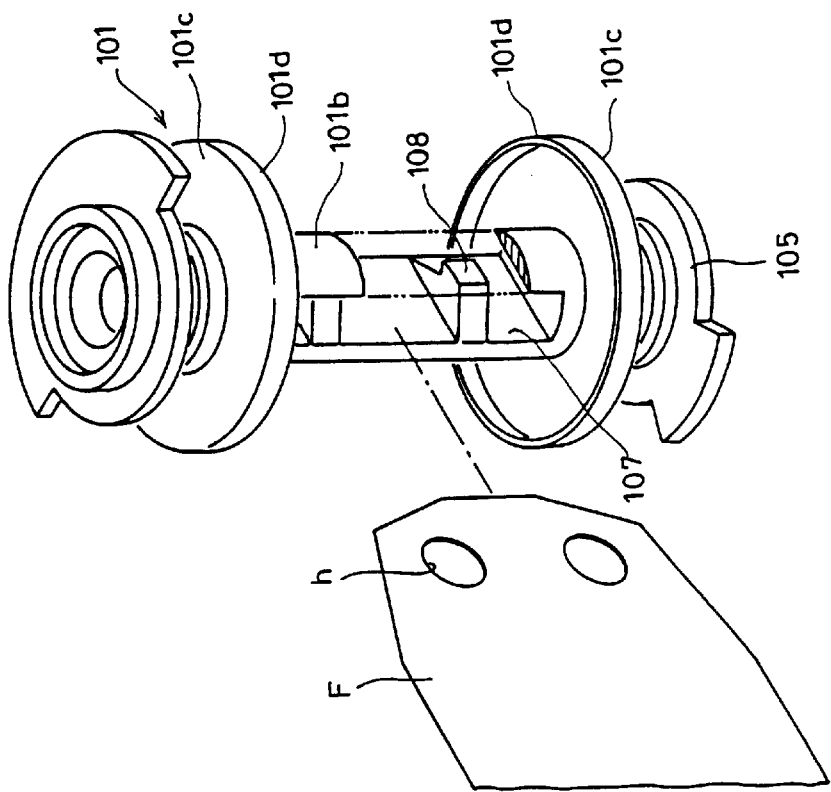
FIG. 16B is a perspective view showing inner structure thereof.
Figure 16A:
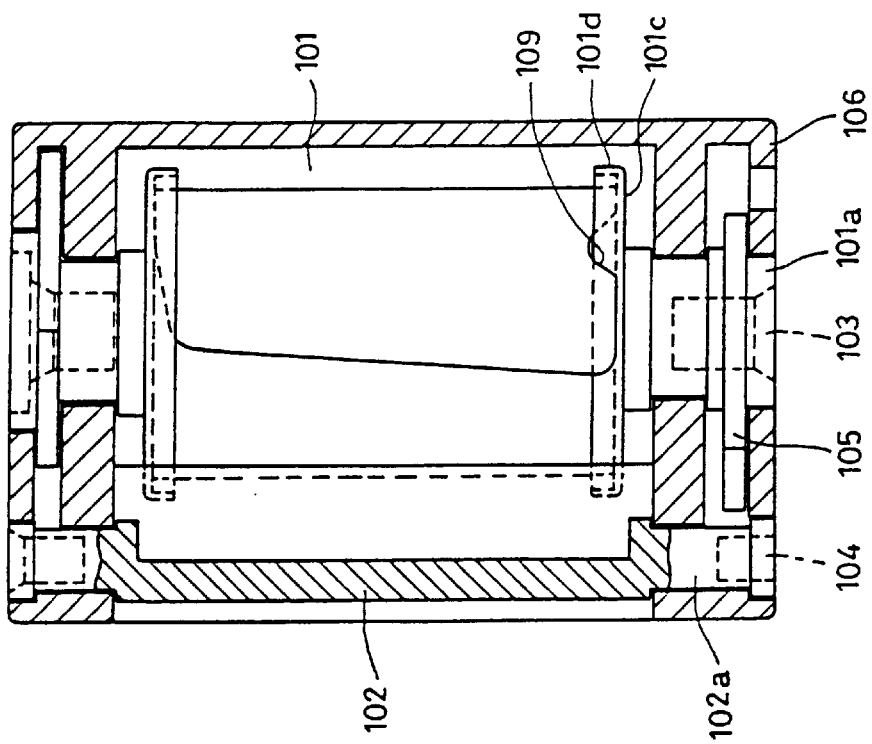
FIG. 16A is a vertical sectional view of the same.

Since the entire control operation has already been described, description is now made of the specific film type determining method with reference to the block diagram of FIG. 13 and the flowchart in FIG. 14.

FIG. 13 shows in block diagram the relationship between the sensor input, the control circuit 50 and the driving unit. FIG. 5 shows by dotted lines cartridge detector 51, an intermediate cartridge detector 52, a slide lever detector 53, IPI detector 48, a tool stand-by position detector 54, a tool insert position detector 55 and a forced start switch 56.

Detection signals from these detectors 51–55 are sent to the control circuit 50 through an input buffer 57. In response, the control circuit 50 sends control signals to a motor driving circuit 59 through an output buffer 58. Thus the motors 31 and 39 are driven.

The infrared LEDs 17a and the visible light LEDs 17b are turned on by output buffers 61 and 62. The infrared LEDs 17a are kept on all the time. Detection signals from the infrared sensors 17a' and visible light sensors 17b', which are light-intercepting sensors, are sent through input amplifiers 62 and 63 to the microcomputer as the control circuit 50. L1–L3 indicate error lamps.

The tool stand-by position detector 54 and the tool insert position sensor 55 are not used in determining the film type but are shown for reference.

The flowchart shown in FIG. 14 is basically the same as the flowchart shown in FIG. 2 but includes the following added functions, which are necessary when the film type determining method is applied to a film rewinder.

That is, the flowchart in FIG. 14 includes added Step S0, in which the slide lever is detected and Step S1', in which the intermediate cartridge is detected before IPI detection in Step S2. Also, if it is found out that the nail has been bent (NO) in the IPI detection in Step S2, the forced start switch is pressed in Step SS2. This is because even if the IPI detection indicates that the film is a developed one, judgment by the IPI detection may be wrong. Thus it is beneficial to turn on the indicator lamps by pressing the forced start switch to attract the attention of an operator.

Also, the flowchart of FIG. 14 differs from that of FIG. 2 in that the rewinding of the film is continued in Step S6 but after bending the nail in Step S7.

As described above, film type is determined both by checking whether of not the film cartridge has a nail and by directly checking by sensors whether the film is a developed film or an undeveloped one. Thus, it is possible to accurately determine the film type before processing the film. The film can thus be processed safely and reliably.

What is claimed is:

1. A method of determining the type of film in a film cartridge, said method comprising:

detecting whether or not a case wall of said cartridge has a nail as a first judgement of whether said film is an undeveloped film or a developed film;

operating a film feeder for the purpose of feeding said film slightly out of a film feed outlet leading from said cartridge;

if said first judgement is that said film is a developed film, emitting visible light toward a film feed passage along which said film is fed from said outlet and thereby determining the presence or absence of said film at said film outlet, while also emitting infrared light toward said film passage and thereby making a second judgement of whether said film is an undeveloped film or a developed film; and if said first judgement is that said film is an undeveloped film, not emitting said visible light, and emitting said infrared light toward said film passage and thereby determining the presence or absence of said film at said film outlet and also making said second judgement of whether said film is an undeveloped film or a developed film.

2. A method as claimed in claim 1, wherein if said first and second judgements agree that said film is a developed film, final judgement is made that said film is a developed film.

3. A method as claimed in claim 1, wherein if said first and second judgements agree that said film is an undeveloped film, final judgement is made that said film is an undeveloped film.

4. A method as claimed in claim 1, wherein if said first judgement is that said film is a developed film and said second judgement is that said film is an undeveloped film, final judgement is made that said film is an undeveloped film.

5. A method as claimed in claim 1, wherein if said first judgement is that said film is an undeveloped film and said second judgement is that said film is a developed film, final judgement is made that the film type is undeterminable.

6. An apparatus for winding a film from a film cartridge, said apparatus comprising:

a detector for detecting whether or not the cartridge has a nail as a first judgement of whether the film is an undeveloped film or a developed film and for producing a first signal representative thereof;

a film feeder for feeding the film out of a film feed outlet leading from the cartridge;

an infrared light emitter to be positioned adjacent the outlet for emitting infrared light toward a film feed passage along which the film is fed from the outlet;

a visible light emitter to be positioned adjacent the outlet for emitting visible light toward the passage;

an infrared light receiver positioned relative to said infrared emitter to receive therefrom infrared light crossing the passage and to produce a second signal representative of the amount of received infrared light; and a visible light receiver positioned relative to said visible light emitter to receive therefrom visible light crossing the passage and to produce a third signal representative of the amount of received visible light.

7. An apparatus as claimed in claim 6, further comprising a controller operable in response to receipt of said first, second and third signals to control operation of said film feeder, said infrared light emitter and said visible light emitter.

8. An apparatus as claimed in claim 7, wherein said controller is operable, in response to receiving said first signal indicative of the film being a developed film, to activate said film feeder for the purpose of feeding the film slightly out of the outlet and to activate said visible light emitter, whereby said third signal will be indicative of the presence or absence of the film at the outlet, and if the film is present, said second signal will be a second judgement of whether the film is an undeveloped film or a developed film.

9. An apparatus as claimed in claim 8, wherein said controller is operable, in response to receiving said first signal indicative of the film being an undeveloped film, to activate said film feeder for the purpose of feeding the film slightly out of the outlet and to not activate said visible light emitter, whereby said second signal will be indicative of the presence or absence of the film at the outlet and also will be a second judgement of whether the film is an undeveloped film or a developed film.

10. An apparatus as claimed in claim 7, wherein said controller is operable, in response to receiving said first signal indicative of the film being an undeveloped film, to activate said film feeder for the purpose of feeding the film slightly out of the outlet and to not activate said visible light emitter, whereby said second signal will be indicative of the presence or absence of the film at the outlet and also will be a second judgement of whether the film is an undeveloped film or a developed film.

* * * * *